United States Patent Office 3,463,793
Patented Aug. 26, 1969

3,463,793
PROCESS FOR THE PREPARATION OF 9α-HALO-GENO-11β-SUBSTITUTED STEROIDS
Hershel L. Herzog, Glen Ridge, William H. Gebert, Morris Plains, Nathaniel M. Murrill, Orange, and Raymond G. Grocela, Wayne, N.J., assignors to Schering Corporation, Bloomfield, N.J., a corporation of New Jersey
No Drawing. Filed May 23, 1966, Ser. No. 551,926
Int. Cl. C07c 167/08, 169/34, 169/30
U.S. Cl. 260—349                                    15 Claims

ABSTRACT OF THE DISCLOSURE

A process for introducing nucleophilic anions into the 11β-position of steroids comprises reacting a 9α-halogeno-11β-X-steroid, X being a leaving group (preferably a halogeno or sulfonyloxy radical), with a nucleophile, YZ, Y being a strong nucleophilic anion (preferably anion (preferably hydroxyl, azide or halide) and Z being a cation, whereby is effected replacement of said 11β-X group by said anion, Y, and there is formed a 9α-halogeno-11β-Y-steroid. Preferred embodiments of this process are those wherein the nucleophilic reagent, YZ, is water and the 11β-X leaving group is either 11β-chloro- or 11β-tosyloxy- whereby are obtained 9α-halogeno-11β-hydroxy-steroids. This process is useful for preparing new classes of compounds, e.g. 9α-halogeno-11β-azido steroids, and in preparing known, pharmacologically active steroids, e.g. hydrocortisone and prednisolone.

---

This invention relates to a novel process and to novel compounds produced thereby.

The invention sought to be patented is described as residing in the concept of reacting a 9α-halogeno-11β-X-steroid selected from the group consisting of the androstane and pregnane series and the 19-nor analogs thereof wherein X is a leaving group, and preferably is halogeno or a sulfonyloxy radical, X being other than iodo when said 9α-halogeno is 9α-iodo; with a reagent, YZ, wherein Y is a strong nucleophilic anion such as hydroxyl, azide, halide, and equivalents thereof; whereby is effected replacement of said 11β-X group by said anion, Y, and there is formed a 9α-halogeno-11β-Y-steroid of the androstane and pregnane series and the 19-nor analogs thereof.

The reagents, YZ, necessary to our process are ionizable compounds known in the art as nucleophiles (i.e. nucleus-loving groups seeking electron-deficient centers) having a nucleophilic anion, Y (preferably hydroxyl, azide, and halide), and a cation, Z (preferably hydrogen, ammonium, and alkali earth and alkaline earth metal ions). The ionizable reagents, YZ, include compounds which are ionized and unionized per se, the per se unionized reagents being ionizable in the sense that they act as donors for the anion, Y, under the conditions of our process. The preferred reagents are those possessing the anions hydroxyl, azide, and halide.

Considered as equivalents of the foregoing preferred nucleophilic anions, are anions Y, such as cyanide, lower alkoxy, phosphate, amino, lower alkylamino, arylamino, lower alkanoyloxy, arylcarboxy, thio, thio-lower alkyl, thioaryl and the like. According to our invention, each of the foregoing anions, Y, when reacted with a 9α,11β-dihalogeno-steroid or a 9α-halogeno-11β-sulfonyloxy-steroid under the conditions of our process will replace the halogeno or sulfonyloxy group at C–11 to form a 9α-halogeno-11β-Y-steroid.

Typical reagents, YZ, which are per se unionized include water (Y=hydroxy), lower alkanoic acids and in particular acetic acid (Y=alkanoyloxy, e.g. acetoxy), arylcarboxylic acids such as benzoic (Y=benzoyloxy) and toluic (Y=toluyloxy) acids, hydrogen sulfide (Y=thiol), alkyl-mercaptans such as methanethiol (Y=thiomethane); arylmercaptans such as benzenethiol (Y=thiophenyl), ammonia (Y=amino); alkyl and aryl amines such as methylamine (Y=methylamino), dimethylamine (Y=dimethylamino), phenylamine (Y=phenylamino); and the like. Typical per se ionized nucleophilic reagents include sodium azide (Y=azide), sodium chloride (Y=chloride), sodium bromide (Y=bromide), potassium cyanide (Y=cyanide), sodium methylate (Y=methoxy), alkali metal hydrosulfides such as sodium hydrosulfide (Y=thiol), alkali metal phosphates (Y=phosphate), and the like.

By terms such as "lower alkyl," "lower alkoxy," "lower alkanoyloxy" are meant radicals wherein the hydrocarbon residue has preferably up to 8 carbon atoms.

By a "leaving group" is meant a group capable of leaving a bonded site when in the presence of a strong nucleophilic anion. We have discovered, for example, that when 9α,11β-dichloro-16α-methyl-1,4-pregnadiene-17α,21-diol-3,20-dione 21-disodium phosphate or 9α-chloro-11β-para-toluene-sulfonyloxy-16α-methyl-1,4-pregnadiene-17α,21-diol-3,20-dione 21-disodium phosphate is dissolved in water, the 11β-chloro (or the 11β-tosyloxy) group leaves the steroid nucleus and is replaced at C–11 by hydroxyl with formation of 9α-chloro-16α-methyl-prednisolone 21-sodium phosphate, a potent anti-inflammatory agent.

Contemplated as equivalents to the preferred halogeno and sulfonyloxy leaving groups (X) are moieties such as those set forth by Cram and Hammond, Orangic Chemistry, 2nd edition, p. 274 (Table 14.2), McGraw-Hill Inc., New York, 1964, including substituted-carboxy, sulfate, chlorosulfite, chlorophosphite, and the like.

The halogens contemplated as leaving groups (i.e. X) at C–11 include fluorine, chlorine, bromine and iodine.

Included within the term "a sulfonyloxy radical," defining a class of preferred leaving groups (X) at C–11, are hydrocarbonsulfonyloxy radicals having up to 20 carbon atoms including alkylsulfonyloxy radicals (e.g. methylsulfonyloxy) (i.e. mesyloxy), ethylsulfonyloxy; arylsulfonyloxy radicals (e.g. benzenesulfonyloxy and naphthalene-β-sulfonyloxy); alkarylsulfonyloxy radicals (e.g. para-toluenesulfonyloxy) (i.e. tosyloxy), ortho-toluenesulfonyloxy, meta - toluene - sulfonyloxy, 3,4 - xylenesulfonyloxy and dodecylbenzenesulfonyloxy. Other sulfonyloxy radicals contemplated at C–11 are substituted hydrocarbonsulfonyloxy radicals having up to 20 carbon atoms exemplified by p-bromobenzenesulfonyloxy, p-chlorobenzenesulfonyloxy, m - chlorobenzenesulfonyloxy, p-nitrobenzenesulfonyloxy, p-methoxybenzenesulfonyloxy, o-dimethylaminobenzenesulfonyloxy, m (or p)-cyano benzenesulfonyloxy, and the like.

Our process is usually carried out in solution in a polar solvent which is preferably a hydroxylic solvent. By hydroxylic solvent is meant a solvent containing a hydroxyl function, including water (which thus may serve a dual role both as solvent and as reagent, YZ), lower alkanols (preferably methanol), phenols, and hydrocarbon carboxylic acids, preferably lower alkanoic acids such as acetic and propionic acids, and mixtures of the foregoing.

Preferred embodiments of our process are those wherein the nucleophilic reagent, YZ, is water (the nucleophilic anion (Y) being hydroxyl, and the cation (Z) being hydrogen), and wherein the 11β-X leaving group is either 11β-chloro or 11β-tosyloxy (i.e. 11β-p-toluenesulfonyloxy), whereby are obtained 9α-halogeno-11β-hydroxy-steroids of the androstane and pregnane series and the 19-nor analogs thereof. The preferred embodiment of our process finds its greatest usefulness when the 9α-halogeno-11β-chloro (or tosyloxy)-starting steroid is a pregnane having a cortical side chain esterified at C–21, said ester being preferably a 21-phosphate alkali metal salt when the starting steroid is a 9α,11β-dihalogeno-21-hydroxypregnane, and being preferably a 21-lower alkanoate when 9α-halogeno-11β-tosyloxy-21-hydroxy-pregnanes are utilized as starting compounds. Reaction of each of the foregoing with water yields 9α-halogeno-11β-hydroxy-pregnanes having the cortical side chain esterified at C–21 by phosphate alkali metal salts or lower alkanoate, respectively, which are a known class of compounds possessing adrenocortical activity (e.g. as in hydrocortisone, prednisolone, and the like which are well-known anti-inflammatory agents).

In general, when carrying out our process, a solution of the 9α-halogeno-11β-X-steroid (X being preferably chloro or tosyloxy) together with the nucleophilic reagent, YZ (the anions, Y, being preferably hydroxyl, azide, and halide) are stirred together at moderate temperatures (usually in the range of about 30–75° C.) until the reaction is completed as evidenced by chromatographic analysis (to determine the absence of starting material), analysis for the presence of an equivalent of the leaving group (e.g. when X is chloro, analysis for chloride ion), as well as other techniques well-known in the art. Isolation of the resulting 9α-halogeno-11β-Y-steroid is then effected according to procedures well-known in the art. Greater yields of substitution products are obtained in shorter periods of time by our process when large molar excess of nucleophilic reagent per mole of 9α-halogeno-steroid are used. Additionally, to minimize undesirable competing side reactions, the pH of the reaction solution is maintained usually in the range of from pH 4 to about pH 8.5 and preferably in the range of from about pH 6 to about pH 7.5.

Thus, in a preferred mode of this invention, 9α,11β-dichloro - 16α-methyl-1,4-pregnadiene-17α,21-diol-3,20-dione 21-disodium phosphate (X is chloro) in water is stirred at 60° C. for about 6 hours during which time the pH falls from about 8.5 to less than 6, as the nucleophile (i.e. Y=hydroxy) enters at C–11 with liberation of chloride (X) ion. The resulting halohydrin (i.e. the 9α-chloro-11β-hydroxy-derivative) is isolated by acidifying the reaction mixture to a pH of less than 1 followed by filtration of the resulting precipitate of 9α-chloro-11β-hydroxy - 16α - methyl-1,4-pregnadiene-17α,21-diol-3,20-dione 21-phosphate (a known anti-inflammatory agent). In turn the 21-phosphate may be subjected to enzymatic dephosphorylation according to known procedures to obtain the parent alcohol, 9α-chloro-16α-methylprednisolone, also a potent anti-inflammatory agent.

In the above reaction the formation of hydrogen chloride resulting from the liberated 11β-chloro-group and cation Z, causes conversion of the disodium phosphate ester to mono sodium ester. Further acidification with strong acid liberates the 21-phosphate ester.

In general, when the starting steroid is a 9α,11β-dihalogeno-21-oxygenated pregnane and it is desired to prepare a 9α-halogeno-11β-hydroxy-pregnane, the 21-phosphate alkali metal salt (e.g. mono or disodium phosphate) is preferred since it renders the steroidal substrate soluble in water and also appears to facilitate the ease with which the leaving group (X) undergoes reaction as measured by the speed of reaction, thus shortening the time necessary to effect complete conversion of the 9α,11β-dihalogeno-steroid to a 9α-halogeno-11β-hydroxy-steroid. Under the conditions set set forth above, the reaction time necessary to convert an 11β-chloro group to an 11β-hydroxyl function in a 9α,11β-dichloro-4-pregnene-17α,21-diol-3,20-dione 21-disodium phosphate is usually from about 3 to 10 hours.

When the free steroidal alcohol or a 21-lower alkanoate or a 21-alkoxycarboxylate thereof is used as starting steroid in the above reaction, a lower alkanol, preferably methanol, is advantageously used as solvent or co-solvent. Thus, when 9α,11β-dichloro-16α-methyl-1,4-pregnadiene-3,20-dione 21-acetate dissolved in 50% aqueous methanol is stirred at 60° C. for 24 hours, there is obtained the corresponding 9α - chloro - 11β-hydroxy-16α-methyl-1,4-pregnadiene-17α,21-diol-3,20-dione 21-acetate in admixture with some of the corresponding 21-hydroxy derivative. The latter compound is formed via hydrolysis of the 21-lower alkanoate by the action of hydrogen chloride formed from the liberated 11β-chloro group and the cation (hydrogen). The mixture of products is easily converted to either the 21-ester alone via reaction with acetic anhydride in pyridine, or to the 21-hydroxy compound by hydrolysis with acid or base by techniques well known in the art.

It is apparent thta in the above reaction, when other halogeno groups are present at C–9 of the starting 9,11-dihalogeno steroids, such as in 9α-bromo-11β-chloro-16α-methyl-1,4-pregnadiene-3,20-dione 21-disodium phosphate and in 9α-fluoro-11β-chloro-1,4-pregnadiene-17α,21-diol-3,20-dione 21-disodium phosphate, reaction thereof with water at 60° C. according to our process, will yield the corresponding halohydrin, e.g. 9α-bromo-11β-hydroxy-16α - methyl-1,4-pregnadiene-17α-21-diol-3,20-dione 21-sodium phosphate, both of which possess strong glucocorticoid activity.

We have described hereinabove a preferred mode of our process wherein a 9α,11β-dihalogeno-21-oxygenated pregnane upon treatment with water is converted to the corresponding 9α-halogeno-11β-hydroxy-derivative. Another preferred embodiment of our process involves replacement of an 11β-sulfonyloxy, preferably an 11β-para-toluenesulfonyloxy (i.e. tosyloxy) group by a hydroxyl group. For example, 9α-chloro-11β-tosyloxy-16α-methyl-1,4 - pregnadiene - 17a,21 - diol - 3,20 - dione 21-cathylate dissolved in 50% aqueous methanol is stirred for about 21 hours at 60° C. The resulting 9,11-halohydrin, i.e. 9α - chloro - 11β - hydroxy - 16α - methyl - 1,4 - pregnadiene-17α,21-diol-3,20-dione 21-cathylate is then conveniently isolated by distilling the methanol followed by extraction of the reaction mixture with a water-immiscible solvent (e.g. methylene chloride) followed by concentration of the combined extracts to yield the 21-cathylate of the aforenamed 9α-chloro-11β-hydroxy-pregnadiene.

The use in our process of an 11β-p-toluenesulfonyloxy as a leaving group is particularly advantageous when it is desired to introduce groups at C–11 other than hydroxyl. For example, when 9α-chloro-11β-tosyloxy-16α-methyl-1,4 - pregnadiene - 17α,21 - diol - 3,20 - dione 21-acetate (i.e. 9α-chloro-16α-methylprednisolone 11-tosylate 21-acetate) is added to a saturated solution of sodium azide in aqueous methanol (e.g. 1:4 water/methanol) (said solution having been titrated to about pH 6 with acetic acid), and said reaction solution is stirred at about 60° C. for about 24 hours, the 11β-tosyloxy group (X) is replaced by the nucleophilic azide anion (Y) with concomitant formation of p-toluenesulfonic acid, and there is formed 9α - chloro-11β-azido-16α-methyl-1,4-pregnadiene-17α,21-diol-3,20-dione, a member of a novel class of compounds, possessing anti-inflammatory activity as described and claimed in U.S. application Ser. No. 638,606 filed May 15, 1967.

We have found when carrying out our process utilizing per se ionized nucleophilic reagents which form strongly basic solutions, such as sodium azide, potassium cyanide and sodium methylate, that it is advantageous to buffer the solutions thereof to a pH in the range of from about 4 to about 7.5 prior to addition of the 9α,11β-dihalogeno- or 9α-halogeno-11β-chlorosteroid in order to minimize undesirable side reactions such as that between halogeno groups and strong bases.

We have also found that, in general, our process proceeds at a faster rate when carried out in the presence of water. Thus, when replacing the 11β-halogeno or an 11β-tosyloxy group at C–11 with an azide, it is advantageous to utilize aqueous methanol as solvent rather than anhydrous methanol.

With the presence of water in the reaction mixture, in addition to effecting replacement of the 11β-halogeno or 11β-tosyloxy group by azide, there is also formed some 11β-hydroxy steroid which is easily separated from the resulting 11β-azido-derivative via chromatographic techniques.

Similarly, when replacing an 11β-tosyloxy group with a halide by reaction with sodium chloride or sodium bromide, our process is best carried out in aqueous methanol. 9α-cholor - 11β - tosyloxy - 16α-methyl-1,4-pregnadiene - 17α,21-diol-3,20-dione 21-cathylate when stirred at 60° C. in a solution of sodium chloride (or sodium bromide) in aqueous methanol affords replacement of the 11β-tosyloxy leaving group by the nucleophilic halide ion to obtain 9α,11β-dichloro-16α-methyl-1,4 - pregnadiene - 17α,21-diol-3,20-dione 21-cathylate (or 9α - chloro - 11β - bromo - 16α - methyl-1,4-pregnadiene - 17α,21-diol-3,20-dione 21-cathylate when sodium bromide is the nucleophilic reagent used).

It is to be noted that in our process the leaving group X may be halogeno and, at the same time the nucleophilic anion may be a halide anion. Thus, for example, 9α,11β-dibromo - 1,4 - pregnadiene - 17α,21-diol-3,20-dione 21-acetate upon reaction with a saturated solution of sodium chloride in aqueous methanol (1:4) according to our process will yield 9α-bromo-11β-chloro-1,4-pregnadiene-17α,21-diol-3,20-dione 21-acetate.

By our novel process it is thus now possible to replace the substituent, X, at C-11 of a 9α,11β-dihalogeno-steroid or a 9α-halogeno-11β-sulfonyloxy-steroid with a nucleophilic anion, Y (preferably hydroxy, halogeno and azido) with retention of the respective spatial configurations at C-9 and C-11, and thereby obtain a 9α-halogeno-11β-Y-steroid. In essence, therefore, the embodiment of our novel process represents a nucleophilic substitution reaction at a saturated carbon atom on a steroidal substrate, with the 11β-X group (e.g. halogeno or sulfonyloxy) being the "leaving group," and the 9α-halogeno-(preferably 9α-chloro-) acting as a "neighboring" group, with the nucleophilic anions, Y (preferably hydroxyl, azide and chloride) entering with formation of the corresponding 9α-halogeno-11β-Y-steroid. It is advantageous that our process produces a 9α-halogeno-11β-nucleophilic substitution steroidal product having the same spatial configuration as the starting 9α-halogeno-11β-halogeno (or sulfonyloxy)-steroid since in the steroid art, and particularly in the adrenocorticoid pregnane series, it is necessary to maintain the 9α-halogeno-11β-Y configuration to maintain pharmacological activity, particularly when Y is hydroxy, since the 9α-halogeno-11β-hydroxy-pregnanes having the cortical side chain at C-17 are, in general active as corticoids, whereas the inverse spatial isomers thereof, i.e. the 11α-hydroxy derivatives are, in general, inactive as corticoids.

In addition to the foregoing, our process provides a convenient method of preparing 21-phosphate esters and salts thereof of 9α-halogeno-11β-hydroxy-pregnanes having the C-17 cortical side chain. This is of particular value when it is desired to prepare the 21-phosphate of a 9α-chloro-11β-hydroxy- or a 9α-bromo-11β-hydroxypregnane such as 9α-chloro-16α-methylprednisolone or 9α-bromo-16α-methylprednisolone which are difficult to prepare via procedures now known in the art.

In general, without affecting the course of our process (i.e. the replacement at C-11 of a sulfonyloxy or a halogeno group by a nucleophilic anion such as hydroxyl, azide and halide), the starting 9α-halogeno-11β-halogeno (or substituted sulfonyloxy)-pregnane or androstane or 19-nor analog thereof may have double bonds present in the steroidal nucleus such as at C-1 and C-4, C-6, C-7, C-8, C-14, C-15 and C-16; methyl, methylene, and hydroxyl substituents and derivatives thereof (e.g. esters and ethers) such as at C-3, C-4, C-5, C-6, C-7, C-14 and C-16; fluoro and chloro such as at C-6 and C-16; and keto groups such as at C-3 and C-16. It is understood that our process may be carried out on any 9α-halogeno-11β-halogeno- (or sulfonyloxy) steroid and utilizing, in addition to the preferred nucleophilic anions, equivalents thereof as set forth hereinabove, and there well be prepared the corresponding 9α-halogeno-11β-Y-steroid.

Thus, 9α-chloro-11β-tosyloxy-16α-methyl-1,4-pregnadiene-17α,21-diol-3,20-dione 21-acetate in an aqueous methanol solution when stirred at 60° C. with a nucleophile such as potassium cyanide, sodium methylate, phosphoric acid, ammonia, methyl amine, phenyl amine, acetic acid, benzoic acid, hydrogen sulfide, methyl mercaptan or phenyl mercaptan will cause replacement of the 11β-tosyloxy group by the nucleophilic anion Y with formation of the corresponding 9α-halogeno-11β-Y-steroid, e.g.

9α-chloro-11β-cyano-16α-methyl-1,4-pregnadiene-17α,21-diol-3,20-dione 21-acetate
9α-chloro-11β-methoxy-16α-methyl-1,4-pregnadiene-17α,21-diol-3,20-dione 21-acetate
9α-chloro-11β-phosphoryloxy-16α-methyl-1,4-pregnadiene-17α,21-diol-3,20-dione 21-acetate
9α-chloro-11β-amino-16α-methyl-1,4-pregnadiene-17α,21-diol-3,20-dione 21-acetate
9α-chloro-11β-methylamino-16α-methyl-1,4-pregnadiene-17α,21-diol-3,20-dione 21-acetate
9α-chloro-11β-phenylamino-16α-methyl-1,4-pregnadiene-17α,21-diol-3,20-dione 21-acetate
9α-chloro-11β-acetoxy-16α-methyl-1,4-pregnadiene-17α,21-diol-3,20-dione 21-acetate
9α-chloro-11β-benzoyloxy-16α-methyl-1,4-pregnadiene-17α,21-diol-3,20-dione 21-acetate
9α-chloro-11β-thiol-16α-methyl-1,4-pregnadiene-17α,21-diol-3,20-dione 21-acetate
9α-chloro-11β-thiomethyl ether-16α-methyl-1,4-pregnadiene-17α,21-diol-3,20-dione 21-acetate
9α-chloro-11β-thiophenyl ether-16α-methyl-1,4-pregnadiene-17α,21-diol-3,20-dione 21-acetate, respectively.

The starting steroids for our process can be any 9α-halogeno steroid which is also substituted at C-11 by a sulfonyloxy radical such as disclosed hereinabove or a halogen, provided that when there is a 9α-iodo group at C-9, the halogen at C-11 is other than iodo, i.e. is a 11β-fluoro-, 11β-chloro- or 11β-bromo-. Usually, our starting compounds are 9α-halogeno-11β- substituted steroids of the androstane and pregnane series including 19-nor analogs thereof. Many of these compounds are known and, if not readily available, are conveniently prepared from the corresponding 9(11)-dehydro steroid according to known procedures such as described (in the case of 9α,11β-dihalogeno steroids) in U.S. Patents Nos. 2,894,963; 3,009,927; 3,009,033; 3,009,938; 3,026,339; 3,032,564; 3,049,554 and 3,131,200. The 9α-halogeno-11β-sulfonyloxy starting steroids are also prepared via procedures known in the art (and as described in detail in Example 8A) from the corresponding 9(11)-dehydro steroid by reaction with p-toluene sulfonic acid in pyridine together with N-bromosuccinimide or N-chlorosuccinimide, for example, whereby are prepared the corresponding 9α-bromo-11β-tosyloxy and the 9α-chloro-11β-tosyloxy steroid, respectively. Some typical intermediates of this group are 9α-chloro-11β-p-toluenesulfonyloxy-1,4-pregnadiene-17α,21-diol-3,20-dione 21-cathylate,
9α-chloro-11β-tosyloxy-1,4-androstadiene-17β-ol-3-one,
9α-chloro-11β-tosyloxy-19-nor-4-androstene-3,17-dione.

When the above 9α-chloro-11β-tosyloxy steroids are treated with water in methanol at, for example 60° C., the tosyloxy group at C-11 is replaced by hydroxy and there are obtained the corresponding 9α-halogeno-11β-hydroxy derivatives, i.e. 9α-chloro-11β-hydroxy-1,4-pregnadiene-17α,21-diol-3,20-dione in admixture with the 21-cathylate thereof, 9α-chloro-11β-hydroxy-1,4-androstadiene-17β-ol-3-one and 9α-chloro-11β-hydroxy-19-nor-4-androstene-3,17-dione, respectively.

Typical 9,11-dihalogeno steroids which undergo the process of this invention include 9,11-dihalogeno-androstanes such as:

9α,11β-dichloro-1,4-androstadiene-3,17-dione,
9α,11β-dichloro-17α-methyl-testosterone acetate,
9α-bromo-11β-fluoro-1,4-androstadiene-3,17-dione,
9α-iodo-11β-chloro-1,4-androstadiene-3,17-dione,
9α-chloro-11β-fluoro-1,4-androstadiene-17β-ol-3-one 17-propionate,
9α-bromo-11β-fluoro-1,4-androstadiene-17β-ol-3-one 17-propionate, each of which when heated with water in methanol at about 60° C. for at least two days will yield the corresponding 9α-halogeno-11β-hydroxy androstane possessing androgenic activity, e.g.

9α-chloro-11β-hydroxy-1,4-androstadiene-3,17-dione,
9α-chloro-11β-hydroxy-17α-methyl-testosterone acetate,
9α-bromo-11β-hydroxy-1,4-androstadiene-3,17-dione,
9α-iodo-11β-hydroxy-1,4-androstadiene-3,17-dione,
9α-chloro-11β-hydroxy-1,4-androstadiene-17β-ol-3-one 17-propionate,
9α-bromo-11β-hydroxy-1,4-androstadiene-17β-ol-3-one 17-propionate, respectively.

Other 9α,11β-dihalogeno starting steroids include 9α,11β-dihalogeno-19-nor-androstanes such as:

6α,-fluoro-9α,11β-dichloro-19-nor-4-androsten-3,17-dione, and
9α-bromo-11β-chloro-19-nor-4-androsten,3,17-dione when treated with water in methanol at 60° C. yields:

6α-fluoro-9α-chloro-11β-hydroxy-19-nor-4-androsten 3,17-dione, and
9α-bromo-11β-hydroxy-19-nor-4-androsten-3,17-dione, respectively, valuable as anabolic and androgenic agents.

Included among the 9α,11β-dihalogeno progesterones which may be used in our process are such as:

9α,11β-dichloro-17α-hydroxy-progesterone,
9α11β-dichloroprogesterone,
9α,11β-dichloro-17α-acetoxyprogesterone,
9α-chloro-11β-fluoro-1,4-pregnadiene-3,20-dione,
9α,11β-dichloro-19-norprogesterone and
9α-bromo-11β-fluoro-17α-hydroxy-19-norprogesterone.

Each of the foregoing, upon treatment with water in methanol at 60° C. according to our process yields:

9α-chloro-11β,17α-dihydroxy-progesterone,
9α-chloro-11β-hydroxyprogesterone,
9α-chloro-11β-hydroxy-17α-acetoxyprogesterone,
9α-chloro-11β-hydroxy-1,4-pregnadiene-3,20-dione,
9α-chloro-11β-hydroxy-19-norprogesterone and
9α-bromo-11β,17α-dihydroxy-19-norprogesterone, respectively, valuable as progestational and anti-conception agents.

Of particular value as starting compounds for the preferred mode of our process are the 21-oxygenated-9,11-dihalogenopregnanes such as are described in U.S. Patents Nos. 2,894,963 and 3,049,554, including 9α,11β-dichloro-1,4-pregnadiene-17α,21-diol-3,20-dione, the 16α-methyl- and the 16β-methyl homoloks thereof as well as the 21-lower alkanoate and 21-disodium phosphate esters thereof, each of which when treated with water according to our process yields the corresponding 9α-chloro-11β-hydroxy-pregnane, e.g. 9α-chloro-prednisolone, the 16α-methyl and the 16β-homologs thereof as well as their 21-lower alkanoates and 21-disodium phosphate esters thereof, all of which are known valuable anti-inflammatory agents.

For purposes of illustration, the process of this invention is disclosed in detail below. It is to be understood that the examples are merely illustrative of the process and are not to be construed as limiting the invention. Obvious equivalents, including those set forth above will be apparent to one skilled in the art.

PREPARATION A

Preparation of 9α-bromo - 11β - chloro-16α-methyl-1,4-pregnadiene-17α,21 - diol - 3,20 - dione 21 - disodium phosphate (1) 16α-methyl - 1,4,9(11) - pregnatriene-17α,21-diol-3,20-dione.—To a solution of 20.6 g. of 16α-methyl-1,4,9(11)-pregnatriene-17α,21-diol-3,20-dione 21-cathylate in 150 ml. of tetrahydrofurane, 100 ml. of methanol and 50 ml. of water at 0° C., add drop-wise 50 ml. of 1-Normal aqueous sodium hydroxide over a one-hour period with stirring while bubbling nitrogen through the solution. Continue stirring at 0° C. under a blanket of nitrogen for another hour and one-half, then neutralize with acetic acid.

Pour into water and filter the resultant precipitate comprising 16α - methyl-1,4,9(11)-pregnatriene-17α,21-diol-3,20-dione.

(2) 16α - methyl - 1,4,9(11) - pregnatriene-17α,21-diol-3,20-dione 21-methanesulfonate.—To a solution of 16 g. of 16α-methyl-1,4,9(11)-pregnatriene-17α,21-diol-3,20-dione in 160 ml. of pyridine at 0° C., with stirring add drop-wise over a 30-minute period 16 ml. of methanesulfonyl chloride, stir at 0° C. for 30 minutes then pour into dilute aqueous hydrochloric acid, filter the resultant precipitate, wash with water and air dry to give 16α-methyl-1,4,9(11)-pregnatriene - 17α,21 - diol-3,20-dione 21-methanesulfonate.

Purify by recrystallizing from acetone-hexane.

(3) 16α - methyl - 21 - iodo-1,4,9(11)-pregnatriene-17α-ol-3,20-dione.—To 12 g. of 16α-methyl-1,4,9(11)-pregnatriene-17α,21-diol-3,20-dione 21-methanesulfonate in 180 ml. of acetone, add 12 g. of sodium iodide and reflux the reaction mixture for 15 minutes. Pour into water and filter, wash with water and dry the resultant precipitate comprising 16α - methyl - 21 - iodo-1,4,9(11)-pregnatriene-17α-ol-3,20-dione.

(4) 16α - methyl - 1,4,9(11) - pregnatriene-17α,21-diol-3,20-dione 21-phosphate.—To 43.03 ml. of methanol at room temperature, add drop-wise with stirring 24.40 ml. of 85% phosphoric acid. To this add cautiously 75.40 ml. of triethylamine followed by 12.7 g. of 16α-methyl-21-iodo-1,4,9(11)-pregnatriene-17α-ol-3,20-dione. Warm the reaction mixture on a steam bath for 30 minutes, then with stirring pour into water (260 ml.) containing concentrated hydrochloric acid (72.54 ml.)

Filter the resultant precipitate comprising 16α-methyl-1,4,9(11) - pregnatriene-17α,21-diol-3,20 - dione 21-phosphate. Purify by crystallization from aqueous acetone.

(5) 9α - bromo-11β-chloro-16α-methyl-1,4-pregnadiene-17α,21-diol-3,20-dione 21-phosphate.—To a solution of 3.27 g. of 16α - methyl-1,4,9(11)-pregnatriene-17α,21-diol-3,20-dione 21-phosphate in 120 ml. of glacial acetic acid, add 13.05 g. of lithium chloride and 1.13 g. of N-bromo acetamide followed immediately by 315 mg. of lithium chloride in tetrahydrofurane (1.35 ml.). Allow the solution to warm to room temperature, then stir for 1 hour and 15 minutes. Pour into water and acidify with concentrated hydrochloric acid.

Filter and dry the resultant precipitate comprising 9α-bromo - 11β - chloro - 16α-methyl-1,4-pregnadiene-17α,21-diol-3,20-dione 21-phosphate. Purify by crystallization from acetone-hexane, M.P. 140° C. dec.; [α]$_D$ +116.8 (dioxane).

(6) 9α - bromo - 11β - chloro-16α - methyl - 1,4-pregnadiene-17α,21-diol-3,20 - dione 21-disodium phosphate.—To a solution of 2 g. of 9α-bromo-11β-chloro-16α - methyl-1,4-pregnadiene-17α,21-diol, - 3,20 - dione 21-phosphate in 100 ml. of aqueous methanol (1:3), add with stirring aqueous sodium hydroxide until the solution is at pH 9.5.

Pour the reaction mixture into 600 ml. of acetone and filter and air dry the resultant precipitate comprising 9α-bromo-11β-chloro-16α - methyl - 1,4 - pregnadiene-17α,21-diol-3,20-dione 21-disodium phosphate.

EXAMPLE 1

9α-chloro-11β-hydroxy-16α-methyl-1,4-pregnadiene-17α, 21-diol-3,20-dione (9α-cholo-16α-methylprednisolene)

A. Preparation of 9α-chloro-11β-hydroxy-16α-methyl-1,4 - pregnadiene - 17α,21 - diol - 3,20 - dione 21 - phosphate from 9α,11β-dichloro - 16α - methyl - 1,4 - pregnadiene - 17α,21 - diol - 3,20 - dione - 21 - disodium phosphate by treatment with water: (1) Heat a solution of 9α,11β - dichloro - 16α - methyl - 1,4 - pregnadiene - 17α,21 - diol - 3,20 - dione 21 - disodium phosphate (800 mg.) in 40 ml. of distilled water at 60° C. for six hours (pH 5.6). Acidify the reaction mixture to a pH less than one by adding hydrochloric acid, and filter the resultant precipitate comprising 9α - chloro - 11β - hydroxy - 16α-methyl - 1,4 - pregnadiene - 17α,21 - diol - 3,20 - dione 21-phosphate (400 mg.). Purify by recrystallization from acetone-water, M.P. 173–175.1° C. $[\alpha]_D^{25}$+106° (dioxane).

(2) In a manner similar to the described above, treat each of 9α,11β - dichloro - 16β - methyl - 1,4 - pregnadiene - 17α,21 - diol - 3,30 - dione 21 - disodium phosphate and 9α,11β - dichloro - 1,4 - pregnadiene - 17α,21-diol - 3,20 - dione 21 - disodium phosphate with water at 60° C. for six hours. Isolate and purify the resultant products produced thereby in the described manner to obtain, respectively, 9α - chloro - 11β - hydroxy - 16β-methyl - 1,4 - pregnadiene - 17α,21 - diol - 3,20 - dione 21 - phosphate and 9α - chloro - 11β - hydroxy - 1,4-pregnadiene - 17α,21 - diol - 3,20 - dione 21 - phosphate.

Similarly, by utilizing 9α,11β-dichloro-4-pregnene-17α,21-diol-3,20-dione 21-disodium phosphate as the starting compound in the above procedure, there is obtained 9α - chloro - 11β - hydroxy - 4 - pregnene - 17α,-21 - diol - 3,20 - dione 21 - phosphate (i.e. 9α - chlorohydrocortisone 21-phosphate), active as an anti-inflammatory agent.

B. 9α - chloro - 11β - hydroxy - 16α - methyl - 1,4-pregnadiene - 17α,21 - diol - 3,20 - dione: (1) To 300 mg. of 9α - chloro - 11β - hydroxy - 16α - methyl - 1,4-pregnadiene - 17α,21 - diol - 3,20 - dione 21 - phosphate dissolved in 4.0 ml. of a 1 molar aqueous trishydroxymethylaminomethane solution titrated to pH 8 with hydrochloric acid add 0.2 ml. of bacterial alkaline phosphatase (Worthington Biochemical Corporation, Freehold, N.J.—chromatographically purified grade). Maintain the reaction mixture at 37° C. for 20 minutes, cool to 25° C., add water, and filter the resultant precipitate comprising 9α - chloro - 11β - hydroxy - 16α - methyl - 1,4 - pregnadiene - 17α,21 - diol - 3,20 - dione. Purify by thin layer chromatography utilizing as solvent chloroform-ethyl acetate (1:1). From the preparative plate, extract the more polar product with chloroform-ethyl acetate (1:1). Concentrate the ethyl acetate-chloroform extract and recrystallize the resultant residue from acetone/hexane; M.P. 237–238° C. (dec.); $[\alpha]_D^{25}$ +106.9 (dimethylformamide);

$\lambda_{max.}^{Nujol}$ 2.81, 2.88, 5.82, 6.00, 6.12, 6.20, 11.26μ

(2) In similar manner, treat 9α-chloro-11β-hydroxy-16β - methyl - 1,4 - pregnadiene - 17α,21 - diol - 3,20-dione 21-phosphate with bacterial alkaline phosphatase in aqueous trishydroxymethylaminomethane. Isolate and purify the resultant products in a manner similar to that described to obtain 9α - chloro - 11β - hydroxy - 16β-methyl - 1,4 - pregnadiene - 17α,21 - diol - 3,20 - dione (i.e. 9α - chloro - 16β - methylprednisolone).

(3) Similarly, treat 9α-chloro-hydrocortisone 21-phosphate with bacterial alkaline phosphatase as described above to obtain 9α-chlorohydrocortisone.

(4) In a manner similar to that described in above Procedure 1B(1), treat 9α - chloro - 11β - hydroxy-1,4 - pregnadiene - 17α,21 - diol - 3,20 - dione 21 - phosphate with bacterial alkaline phosphatase. Isolate the resultant product in a manner similar to the described in 1B(1) to give 9α - chloro - 11β - hydroxy - 1,4 - pregnadiene - 17α,21 - diol - 3,20 - dione (i.e. 9α - chloroprednisolone).

Dissolve 150 mg. of 9α-chloroprednisolone (prepared as in the preceding paragraph) in pyridine (1.5 ml.) with acetic anhydride (0.15) and allow to stand at room temperature for 18 hours. Pour into water and filter, wash with water, and dry the resultant precipitate comprising 9α-chloroprednisolone 21-acetate. Purify by silica gel preparative thin-layer chromatography utilizing chloroform-ethyl acetate (3:2) as solvent. Extract the more polar product from the preparative plate with methylene chloride and tetrahydrofuran. Crystallize from acetone-hexane yielding 9α-chloroprednisolone 21-acetate, M.P. 229–235° C. (dec.) $[\alpha]_D$ +141° (ethanol);

$\lambda_{max.}^{methanol}$ 239 mμ ($\epsilon$=14,700)

EXAMPLE 2

Preparation of 9α-chloro-11β-hydroxy-16α-methyl-1,4-pregnadiene - 17α,21 - diol - 3,20 - dione 21 - phosphate from 9α,11β - dichloro - 16α - methyl - 1,4-pregnadiene - 17α,21 - diol - 3,20 - dione 21 - disodium phosphate by treatment with water methanol (50:50)

In a manner similar to that described in Example 1A, heat a solution of 500 mg. 9α,11β-dichloro-16α-methyl-1,4 - pregnadiene - 17α,21 - diol - 3,20 - dione 21 - disodium phosphate in 40 ml. of a methanol water mixture (50:50) at 60° C. for 24 hours. Acidify the reaction mixture to a pH less than one by adding hydrochloric acid. Filter the resultant precipitate comprising 9α-chloro-11β-hydroxy - 16α - methyl - 1,4 - pregnadiene - 17α,21 - diol-3,20 - dione 21 - phosphate. Purify by crystallization from acetone/hexane, M.P. 173–175° C.

EXAMPLE 3

9α-chloro-11β-hydroxy-16α-methyl-1,4-pregnadiene-17α, 21-diol-3,20-dione (9α-chloro-16α-methylprednisolone)

A. Preparation of 9α - chloro - 11βhydroxy - 16α-methyl - 1,4 - pregnadiene - 17α,21 - diol - 3,20 - dione 21-diol-3,20-dione (9α-chloro-16α-methylprednisolone) 1,4 - pregnadiene - 17α,21 - diol - 3,20 - dione 21 - disodium phosphate by treatment with human serum.— Dissolve 800 mg. of 16α-methyl-9α,11β-dichloro-1,4-pregnadiene-17α,21-diol-3,20-dione 21-disodium phosphate in 40 ml. of human serum (human whole blood less red cells) at pH 7. Stir the reaction mixture at 38° C. for five days, then add water. Add concentrated hydrochloric acid until the pH of the reaction mixture is less than one, then extract with ethyl acetate (about one liter). Wash the combined ethyl acetate extracts with water, then dry over sodium sulfate and evaporate in vacuo to a residue comprising 9α - chloro - 11β - hydroxy - 16α - methyl-1,4 - pregnadiene - 17α,21 - diol - 3,20 - dione 21 - phosphate (460 mg.). This product was used without purification in procedure 3B immediately following.

Similarly, when the above reaction is carried out for only 24 hours at 38° C. (rather than for five days as set forth above) and the resultant product is isolated and purified in a manner similar to that described above, there is obtained 9α - chloro - 11β - hydroxy - 16α-methyl - 1,4 - pregnadiene - 17α,21 - diol - 3,20 - dione 21-phosphate.

B. 9α - chloro-16α-methylprednisolone.—To 300 mg. of the product of Example 3A comprising 9α-chloro-16α-methylprednisolone 21-phosphate dissolved in 6 ml. of a one molar aqueous solution of trishydroxymethylaminomethane titrate to pH 8 with hydrochloric acid, add 0.3

11 ml. of bacterial alkaline phosphatase. Maintain the reaction mixture at 37° C. for 20 minutes. Add water and extract with methylene chloride. Combine the methylene chloride extracts, wash with water, dry over sodium sulfate, and evaporate to a residue (224 mg.) comprising 9α-chloro-11β-hydroxy-16α-methyl-1,4-pregnadiene - 17α,21-diol-3,20-dione. Purify by thin layer chromatography utilizing as solvent chloroform-ethyl acetate (3:2). From the preparative plate, extract the more polar product with methylene chloride-acetone. Concentrate the methylene chloride acetone extract and crystallize the resultant residue from acetone-hexane to give 9α-chloro-11β-hydroxy-16α-methyl-1,4-pregnadiene-17α,21-diol-3,20-dione.

EXAMPLE 4

Preparation of 9α-chloro-11β,17α-dihydroxyprogesterone from 9α,11β - dichloro - 17α - hydroxyprogesterone by treatment with water-methanol (1:1)

Dissolve 115 mg. of 9α,11β-dichloro-17α-hydroxyprogesterone in methanol (400 ml.) and water (400 ml.). Heat the solution with stirring at 60° C. for 24 hours. Distill the reaction mixture to a smaller volume, then add water and extract with methylene chloride. Evaporate the combined methylene chloride extracts to a residue comprising 9α-chloro-11β,17α-dihydroxyprogesterone. Purify by thin layer chromatography utilizing as solvent chloroform ethyl acetate (3:1). From the preparative plate, extract the more polar solvent product with chloroform-acetone. Concentrate the combined extracts and crystallize the resultant residue from ether to give 9α-chloro-11β,17α-dihydroxyprogesterone;

$\lambda_{max.}^{methanol}$ 240 m$\mu$; $\lambda_{max.}^{Nujol}$ 2.87, 5.87, 602, and 616$\mu$

EXAMPLE 5

9α - bromo - 11β - chloro - 16α-methyl-1,4 - pregnadiene-17α,21-diol-3,20-dione (9α-bromo-16α-methylprednisolone)

A. Preparation of 9α-bromo-11β-hydroxy-16α-methyl-1,4-pregnadiene-17α,21-diol-3,21-dione 21-phosphate from 9α - bromo - 11β - chloro - 16α-methyl-1,4 - pregnadiene-17α,21-diol-3,20-dione 21-disodium phosphate by treatment with water.—dissolved 9α-bromo-11β-chloro-16α-methyl-1,4-pregnadiene-17α,21 - diol-3,20-dione 21-disodium phosphate (800 mg.) in distilled water (40 ml.) and stir at 60° C. for three hours, cool, (solution pH=2) and acidify the reaction mixture to a pH less than one by adding hydrochloric acid. Extract the reaction mixture with ethyl acetate. Dry the combined extracts over sodium sulfate, and evaporate in vacuo to a residue (560 mg.) comprising 9α-bromo-11β-hydroxy-16α-methyl-1,4-pregnadiene-17α,21-diol-3,20-dione 21-phosphate. This product is used without further purification in following Procedure 5B.

B. 9α-bromo-11β-hydroxy-16α-methyl - 1,4 - pregnadiene-17α,21-diol-3,20-dione.—Dissolve 560 mg. of 9α-bromo-11β-hydroxy-16α - methyl-1,4-pregnadiene-17α,21-diol-3,20-dione 21-phosphate (prepared as in Example 5A) in 12 ml. of one molar aqueous trishydroxymethylaminomethane titrate to pH 8 with hydrochloric acid. Add 0.5 ml. of macterial alkaline phosphatase, and maintain the reaction mixture at 37° C. for 20 minutes. Add water to the reaction mixture, extract with chloroform, dry the combined extracts over sodium sulfate, and evaporate to a residue comprising 9α-bromo-11β-hydroxy-16α-methyl-1,4-pregnadiene-17α,21-diol-3,20-dione (323 mg.). Purify by thin layer chromatography utilizing as solvent chloroform ethyl acetate (3:2). From the preparative plate, extract the more polar product with methylene chloride-acetone (1:1) and evaporate the extract to a residue comprising 9α-bromo-11β-hydroxy-16α-methyl-1,4 - pregnadiene-17α,21-diol-3,20-dione.

12

EXAMPLE 6

9β,11β-oxido-16α-methyl-1,4-pregnadiene-17α,21-diol-3,20-dione

Dissolve 159 mg. of 9α-bromo-11β-hydroxy-16α-methyl-1,4-pregnadiene-17α,21-diol-3,20-dione (prepared as described in Example 5B) in methanol, and cool to 0° C. Add two drops of aqueous one normal sodium hydroxide, and allow the solution to stand at 0° C. for 15 minutes. Add water, and then acetic acid until the solution is at pH 7. Extract with methylene chloride, dry the combined extracts with sodium sulfate and evaporate in vacuo to a residue comprising 9β,11β-oxido-16α-methyl-1,4-pregnadiene-17α,21-diol-3,20-dione (137 mg.). Purify by crystallization from ethyl acetate;

$\lambda_{max.}^{Nujol}$ 2.95, 5.78, 6.00, 6.17, 6.3 and 11.2$\mu$

EXAMPLE 7

Preparation of 9α-chloro-11β-hydroxy-16α-methyl-1,4-pregnadiene-17α,21-diol-3,20-dione 21-acetate (9α-chloro-16α-methyl-prednisolone 21-acetate) from 9α,11β-dichloro-16α-methyl - 1,4-pregnadiene-17α,21-diol-3,20-dione 21-acetate by treatment with water-methanol A. Dissolve 9α-11β - dichloro - 16α-methyl - 1,4 - pregnadiene - 17α,21 - diol - 3,20-dione 21-acetate (115 mg.) in methanol (400 ml.) and water (400 ml.) and stir at 60° C. for 24 hours. Concentrate the reaction mixture in vacuo until it is about one-third its original volume. Filter, and extract the aqueous filtrate with methylene chloride. Dry the combined methylene chloride extracts over sodium sulfate and evaporate to a residue comprising a mixture of 9α - chloro - 11β - hydroxy-16α-methyl-1,4-pregnadiene-17α,21-diol-3,20-dione and the 21-acetate thereof.

Dissolve the above product mixture in pyridine (0.4 ml.), and add acetic anhydride (0.04 ml.), and allow to stand at room temperature for about 18 hours. Pour into water, extract with ethyl acetate. Combine the ethyl acetate extracts, wash with water, dry over sodium sulfate, filter, and evaporate to a residue comprising 9α-chloro-11β-hydroxy-16α-methyl-1,4-pregnadiene - 17α,21 - diol-3,20-dione 21-acetate (9α-chloro-16α-methylprednisolone 21-acetate). Purify by thin layer chromatography utilizing chloroform-ethyl acetate (3:2) as solvent. Extract the more polar product from the preparative plate with acetone and methylene chloride. Evaporate this extract to a residue and crystallize from acetone-hexane. The infrared spectrum matches that of an authentic sample of 9α-chloro-16α-methylprednisolone 21-acetone as follows;

$\lambda_{max.}^{Nujol}$ 2.86, 2.95, 5.64, 5.8, 6.0, 6.14, 6.20 and 11.22$\mu$

B. Stir a solution of 9α,11β - dichloro-16α-methyl-1,4-pregnadiene-17α,21-diol-3,20-dione 21-acetate (200 mg.) in methanol (40 ml.) plus distilled water (20 ml.) at 60° C. for four days. Add a large volume of water and filter. Wash with water, and dry the resultant precipitate comprising 9α - chloro-11β - hydroxy-16α - methyl-1,4-pregnadiene - 17α,21-diol-3,20-dione and the 21-acetate thereof, as well as some starting material (158 mg.). Isolate the desired product by thin layer chromatography utilizing chloroform-ethyl acetate (3:2) as solvent. Extract the more polar products from the preparative plate with acetone-methylene chloride, and evaporate this extract to a residue comprising a mixture of 9α-chloro-11β-hydroxy - 16α - methyl - 1,4-pregnadiene - 17α,21-diol-3,20-dione and the 21-acetate thereof. Dissolve this product mixture in pyridine (1.6 ml.). Add acetic anhydride (0.6 ml.) and allow to stand at room temperature for about 18 hours. Pour into water, and filter. Wash with water, and dry the resultant product comprising 9α-chloro-11β-hydroxy-16α-methyl - 1,4-pregnadiene - 17α,21-diol-3,20-dione 21-acetate. Purify by thin layer chromatography utilizing chloroform-ethyl acetate (3:2) as solvent and extracting the more polar product with acetone-methylene chloride to obtain 9α-chloro-16α-methylprednisolone 21-acetate.

C. In above procedures 7A and 7B, by utilizing instead of 9α,11β-dichloro - 16α-methyl-1,4-pregnadiene-17α,21-diol-3,20 - dione 21-acetate, other 9α,11β-dihalogeno steroids such as 9α,11β - dichloro - 4-pregnene-16α,17α,21 - triol-3,20-dione 16,21-diacetate, 2α-methyl-9α11β - dichloro-4-pregnene 17α-21-diol - 3,20-dione 21-acetate, there is obtained, respectively 9α-chloro - 11β-hydroxy-4-pregnene-16α,17α,21-triol 3,20-dione 16,21-diacetate in admixture with the 16-mono-acetate thereof, and 2α - methyl - 9α-chloro - 11β-hydroxy - 4 - pregnene-17α,21-diol-3,20-dione in admixture with the 21-acetate thereof.

Reaction of each of the foregoing with acetic anhydride in pyridine will yield the respective completely esterified product.

D. In above procedure 7A and 7B, lower alkanoic acid esters may be present at C-21 such as the 21-t-butyrate, 21-enanthate, 21-caproate, 21-caprylate, and 21-decanoate of 9α,11β-dichloro - 16α-methyl - 1,4-pregnadiene-17α,21-diol-3,20-dione, and there will be prepared 9α-chloro-11β - hydroxy - 16α-methyl-1,4 - pregnadiene-17α,21-diol-3,20-dione in admixture with the corresponding 21-alkanoate.

EXAMPLE 8

9α-chloro - 11β-hydroxy - 16α-methyl - 1,4-pregnadiene-17α,21-diol-3,20 - dione 21 - cathylate (9α-chloro-16α-methylprednisolone 21-cathylate)

A. 9α-chloro - 11β-tosyloxy - 16α-methyl-1,4-pregnadiene-17α,21-diol-3,20-dione 21-cathylate.—The requisite intermediate 16α-methyl-1,4,9(11)-pregnatriene - 17α,21-diol-3,20-dione 21-cathylate is prepared from 16α-methyl-1,4,9(11) - pregnatriene - 17α,21 - diol - 3,20-dione utilizing known procedures by treatment with ethylchloro carbonate in pyridine at room temperature.

Dissolve 100 g. of p-toluene sulfonic acid monohydrate and 27.33 g. of sodium p-toluene sulfonate in one liter of pyridine and concentrate this solution in vacuo to about 500 ml. maintaining the temperature at about 40° C. Cool to room temperature and add 13.17 g. of recrystallized N-chlorosuccinimide followed immediately with 20 g. of 16α-methyl - 1,4,9(11)-pregnatriene-17α21-diol-3,20-dione 21-cathylate (prepared as described above). Stir the reaction mixture at room temperature for 20 hours, then pour into 10 liters of an ice/water mixture containing one liter of concentrated sulfuric acid. Filter the resultant precipitate, wash to neutrality with water and air dry at 60° C. to give 9α-chloro-11β-tosyloxy-16α-methyl - 1,4-pregnadiene-17α,21-diol-3,20-dione 21-cathylate. Purify by chromatography on silica gel eluting with 10-15% ethyl acetate in chloroform. Combine the early, like fractions and concentrate to a residue. Crystallize this residue from acetone-hexane to give 9α-chloro-11β-tosyloxy - 16α-methyl-1,4 - pregnadiene-17α, 21-diol - 3,20-dione 21-cathylate; M.P. 201–203° C.; [α]$_D$+65° (dioxane);

$\lambda^{methanol}_{max.}$ 231 mµ ($\epsilon$=26,600)

B. Preparation of 9α-chloro-11β-hydroxy - 16α-methyl-1,4-pregnadiene - 17α,21-diol-3,20-dione 21 - cathylate (9α-chloro - 16α-methylprednisolone 21-cathylate) from 9α-chloro - 11β-tosyloxy - 16α-methyl-1,4-pregnadiene-17α,21 - diol-3,20-dione 21-cathylate by treatment with methanol-water (1:1).—Heat a solution of 9α-chloro-11β-tosyloxy - 16α-methyl-1,4-pregnadiene - 17α,21-diol-3,20-dione 21-cathylate (100 mg.) in methanol (400 ml.) and distilled water (400 ml.) at 60° C. for 24 hours. Concentrate the reaction mixture to a volume of about 20 ml. Cool and filter the resultant product comprising 9α-chloro - 11β-hydroxy - 16α-methyl-1,4-pregnadiene-17α, 21-diol-3,20 - dione 21-cathylate. Purify by thin layer chromatography on a preparative thin layer plate (silica gel) utilizing ethyl acetate-chloroform (1:3) as solvent followed by crystallization from acetone-hexane; M.P. 214–219° C. Yield=55 mg.

In the preceding paragraph, the infrared spectrum and the thin layer chromatography of this compound is identical to that of a sample prepared according to the alternate procedure described in Example 8C below.

C. Dissolve 100 mg. of 9α-chloro - 16α-methylprednisolone in 1 ml. of dry pyridine at 0–5° C. Add 0.03 ml. of ethyl chloroformate and stir at 0–5° C. for one hour. Pour the reaction mixture into 10 ml. of water containing 1 ml. of hydrochloric acid. Filter and dry the resultant precipitate comprising 9α-chloro-16α-methylprednisolone 21-cathylate.

EXAMPLE 9

Preparation of 9α-chloro - 11β-azido - 16α-methyl-1,4-pregnadiene - 17α,21-diol-3,20-dione 21-cathylate from 9α-chloro - 11β-tosyloxy - 16α-methyl-1,4-pregnadiene-17α,21-diol-3,20-dione 21-cathylate by treatment with sodium azide in methanol-water (1:1)

Add acetic acid to a solution of 150 g. of sodium azide in 1.5 liters of water and 1.5 liters of methanol until the pH of the solution is 6.6. Add 3 g. of 9α-chloro-11β-tosyloxy - 16α-methyl-1,4-pregnadiene - 17α,21-diol-3,20-dione 21-cathylate and stir at 60° C. for 48 hours. Add 2 liters of water and extract with methylene chloride. Wash the combined methylene chloride extracts with water and dry over magesium sulfate. Concentrate in vacuo to a residue comprising 9α - chloro-11β-azido - 16α-methyl - 1,4-pregnadiene - 17α,21-diol-3,20-dione 21-cathylate. Purify via preparative thin layer chromatography on silica gel utilizing ethyl acetate-cyclohexane (2:3) as solvent followed by crystallization from acetone-hexane to give 9α-chloro-11β-azido - 16α-methyl-1,4 - pregnadiene - 17α,21-diol-3,20 - dione 21-cathylate; M.P. 220–223° C.; [α]$_D$+168.4° (dioxane);

$\lambda^{methanol}_{max.}$ 238 mµ

EXAMPLE 10

Preparation of 9α,11β - dichloro-16α-methyl-1,4-pregnadiene - 17α,21-diol-3,20-dione 21-cathylate from 9α-chloro - 11β-tosyloxy - 16α-methyl - 1,4-pregnadiene-17α,21-diol-3,20-dione 21 cathylate by treatment with sodium chloride in methanol-water (1:1)

To a solution of 40 g. of sodium chloride in 200 ml. of methanol and 200 ml. of water, add 50 mg. of 9α-chloro-11β-tosyloxy - 16α-methyl-1,4-pregnadiene - 17α,21-diol-3,20-dione 21-cathylate (the compound of Example 8A), and heat at 60° C. for 70 hours. Concentrate the reaction mixture almost to dryness, then add methylene chloride and filter. Dry the methylene chloride solution over magnesium sulfate and concentrate to a residue comprising 9α,11β-dichloro - 16α-methyl - 1,4-pregnadiene - 17α, 21-diol-3,20-dione 21-cathylate.

EXAMPLE 11

9α-chloro-11β-azido-16α-methyl-1,4-pregnadiene-17α,21-diol-3,20-dione 21-acetate A. 9α-chloro - 11β-tosyloxy - 16α-methyl-1,4-pregnadiene-17α,21-diol-3,20-dione 21-acetate.—To a solution of 16α-methyl - 1,4,9(11) - pregnatriene - 17α,21-diol-3, 20-dione 21-acetate (6.0 g.) in 600 ml. of pyridine, add 8 g. of sodium tosylate and 30 g. of p-toluene sulfonic acid monohydrate. Concentrate the mixture to a volume of 300 ml., then add 4 g. of N-chlorosuccinimide and stir at room temperature for 24 hours. Pour the reaction mixture into 3 liters of cold 10% aqueous sulfuric acid. Filter and air dry the resultant precipitate comprising 9α-chloro - 11β-tosyloxy - 16α - methyl - 1,4-pregnadiene-17α,21-diol-3,20-dione 21-acetate. Purify via chromatography on silica gel eluting with 15% ethyl acetate in chloroform. Evaporate the combined eluates to a residue, then crystallize the residue from acetone-hexane; M.P. 203–206° C.; [α]$_D$+71.2 (dioxane);

$\lambda_{max.}^{methanol}$ 230 mμ (ε=19,500)

B. Preparation of 9α-chloro - 11β-azido - 16α-methyl-1,4-pregnadiene - 17α,21-diol-3,20-dione 21-acetate from 9α-chloro - 11β-tosyloxy - 16α-methyl - 1,4-pregnadiene-17α,21 - diol - 2,20-dione 21-acetate by treatment with methanol-water.—To a solution of 100 g. of sodium azide in one liter of water and 2.5 liters of methanol, add acetic acid until the solution is at pH 6.0. Add 2 g. of 9α-chloro - 11β-tosyloxy - 16α-methyl - 1,4 - pregnadiene-17α,21-diol-3,20-dione 21-acetate and stir at 60° C. for 24 hours. Add 3 liters of water to the reaction mixture and extract with methylene chloride. Wash the methylene chloride extracts with water, dry over magnesium sulfate and concentrate to a residue comprising 9α-chloro - 11β-azido - 16α-methyl - 1,4-pregnadiene - 17α,21-diol-3,20-dione 21-acetate. Purify via preparative thin layer chromatography on silica gel utilizing as solvent ethyl acetate-cyclohexane (2:3). Extract with chloroform the chloro-azide product as determined by infrared and ultraviolet spectra, then recrystallize the residue of the chloroform extracts from ethyl acetate; M.P. 246–247° C.; [α]$_D^{25}$+177.8° (dioxane);

$\lambda_{max.}^{methanol}$ 238 mμ (15,600)

EXAMPLE 12

Preparation of 9α-chloro - 11β-hydroxy - 17α-methyl-4-androsten - 17β-ol-3-one from 9α,11β-dichloro - 17α-methyl-4-androsten - 17β-ol-3-one by treatment with water-methanol Heat a solution of 100 mg. of 9α,11β-dichloro - 17α-methyl-4-androsten - 17β-ol-3-one in 400 ml. of methanol and 400 ml. distilled water at 60° C. for 48 hours. Concentrate the reaction mixture in vacuo to about 20 ml., then extract the residue with methylene chloride. Dry the methylene chloride extract with anhydrous magnesium sulfate and concentrate in vacuo to a residue comprising 9α - chloro - 11β - hydroxy - 17α-methyl-4-androsten - 17β-ol-3-one (i.e. 9α-chloro - 11β-hydroxy-17α - methyltestosterone). Purify via preparative thin-layer chromatography on silica gel eluting with chloroform ethyl acetate (9:1). Crystallize from acetone-hexane.

EXAMPLE 13

Preparation of 6α-fluoro - 9α-chloro - 11β-hydroxy-19-nor-4-androstne - 3,17-dione from 6α-fluoro-9α,11β-dichloro-19-nor-4-androstene - 3,17 - dione by treatment with water-methanol In a manner similar to that described in Example 12, heat 100 mg. of 6α-fluoro-9α,11β - dichloro - 19-nor-4-androstene - 3,17-dione in 400 ml. of water and 400 ml. of methanol for 72 hours at 60° C. Isolate and purify the resultant product in a manner similar to that described in Example 12 to give 6α-fluoro-9α-chloro - 11β-hydroxy-19-nor-4-androstene-3,17-dione.

EXAMPLE 14

Preparation of 9α - chloro - 11β - hydroxy - 19 - nor-4-pregnene-3,20-dione (9α-chloro - 11β-hydroxy-19-norprogesterone) from 9α,11β - dichloro - 19 - nor - 4-pregnene-3,20-dione by treatment with water-methanol Heat 100 mg. of 9α,11β - dichloro-19-nor-4-pregnene-3,20-dione in 400 ml. of distilled water and 400 ml. of methanol at 60° C. for 48 hours. Isolate and purify the resultant product in a manner described in Example 12 to get 9α - chloro - 11β-hydroxy - 19-nor-4-pregnene-3,20-dione.

EXAMPLE 15

9α-chloro-11β-hydroxy-1,4-androstadien-17β-ol-3-one

A. 9α - chloro - 11β-tosyloxy-1,4-androstadien-17β-ol-3-one.—Dissolve 40 gm. of p-toluene sulfonic acid monohydrate and 7 gm. of sodium p-toluene sulfonate in 600 ml. of pyridine. Then concentrate the solution in vacuo to about 300 ml. At room temperature add 3 gm. of 1,4,9(11)-androstatrien-17β-ol-3-one followed immediately by 2.8 gm. of recrystallized N-chlorosuccinimide. Stir the reaction mixture at room temperature for 20 hours, then pour into 4 liters of iced water containing 400 ml. of concentrated sulfuric acid. Filter, wash to neutrality with water and air dry at 60° C., the resultant precipitate comprising 9α - chloro-11β-tosyloxy-1,4-androstadien-17β-ol-3-one. Purify via chromatography on silica gel, eluting with 10:15% ethyl acetate in chloroform. Concentrate the combined eluants and crystallize the resultant residue from acetone-hexane.

B. Preparation of 9α-chloro-11β-hydroxy-1,4-androstadien-17β-ol-3-one from 9α-chloro-11β-tosyloxy-1,4-androstadien-17β-ol-3-one by treatment with water-methanol.—Heat a solution of 100 mg. of 9α-chloro-11β-tosyloxy-1,4-androstadien-17β-ol-3-one in 400 ml. of distilled water and 400 ml. methanol at 60° C. for 24 hours. Isolate and purify the resultant product in a manner similar to that described in Example 12 to give 9α-chloro-11β-hydroxy-1,4-androstadien-17β-ol-3-one.

EXAMPLE 16

9α-chloro-11β-hydroxy-19-nor-4-androstene-3,17-dione

A. 9α - chloro-11β-tosyloxy-19-nor-4-androstene-3,17-dione.—Dissolve 70 g. of p-toluene sulfonic acid monohydrate and 19 g. of sodium p-toluene sulfonate in 1 liter of pyridine, then concentrate the solution to a volume of 500 ml. Add 5 g. of 19-nor-4,9(11)-androstadiene-3,17-dione followed immediately by 5 g. of recrystallized N-chlorosuccinimide and stir at room temperature for 18 hours. Pour the reaction mixture into 4 liters of iced water containing 400 ml. of concentrated sulfuric acid. Filter the resultant precipitate, wash to neutrality with water and air dry to yield 9α-chloro-11β-tosyloxy-19-nor-4-androstene-3,17-dione. Purify via chromatography on silica gel eluting with 10:15% ethyl acetate in chloroform. Concentrate the combined eluants and crystallize the resultant residue from acetone-hexane.

B. Preparation of 9α-chloro-11β-hydroxy-19-nor-4-androstene-3,17-dione from 9α-chloro-11β-tosyloxy-19-nor-4-androstene-3,17-dione.—Stir a solution of 100 mg. of 9α-chloro-11β-tosyloxy-19-nor-4-androstene-3,17-dione in 400 ml. of methanol and 400 ml. of water at 60° C. for 24 hours. Isolate the resultant product in a manner similar to that described in Example 12 to give 9α-chloro-11β-hydroxy-19-nor-4-androstene-3,17-dione.

EXAMPLE 17

9α-chloro-11β-17α-dihydroxy-19-nor-progesterone

A. 9α - chloro-11β-tosyloxy-17α-hydroxy-19-nor-progesterone.—In a manner similar to that described in Example 15A, dissolve 48 g. of p-toluene sulfonic acid monohydrate and 9.7 g. of sodium p-toluene sulfonate in 600 ml. pyridine and concentrate the solution in vacuo to a volume of 400 ml. Add 4 g. of 17α-hydroxy-19-nor-4,9(11) progesterone followed immediately by 3.4 g. of recrystallized N-chlorosuccinimide. Stir at room temperature for 18 hours. Isolate and purify the resultant product in a manner similar to that described in Example 15A to give 9α-chloro-11β-tosyloxy-17α-hydroxy-19-progesterone.

B. Preparation of 9α - chloro-11β-17α-dihydroxy-19-nor-progesterone from 9α-chloro-11β-tosyloxy-17α-hydroxy-19-nor-progesterone.—Stir a solution of 100 mg. of 9α-chloro - 11β-tosyloxy-17α-hydroxy-19-nor-progesterone in 400 ml. of methanol and 400 ml. of water at 60° C. for 24 hours. Isolate and purify the resultant product in a manner similar to that described in Example 12 to give 9α-chloro-11β-17α-dihydroxy-19-nor-progesterone.

EXAMPLE 18

9α-chloro-11β-hydroxy-16α-methyl-1,4-pregnadiene-17α, 21-diol-3,20-dione 21-alkoxycarboxylates A. In a manner similar to that described in Example 8, other 21-alkoxycarboxyloxy esters of 16-methyl-1,4,9(11)-pregnatriene-17α,21-diol-3,20-dione are prepared by treatment thereof with other alkylchlorocarbonates such as methylchlorocarbonate, propylchlorocarbonate, n-butylchlorocarbonate, n-octylchlorocarbonate, and n-decylchlorocarbonate to obtain respectively, the 21-carbomethoxylate, 21-carbopropoxylate, 21-carbobutoxylate, 21-carbooctoxylate and the 21-carbodecoxalate of 16α-methyl-1,4, 9(11)-pregnatriene-17α,21-diol-3,20-dione.

Treat each of the foregoing 21-carboalkoxylates with p-toluene sulfonic acid and the sodium salt thereof in the manner described in Example 8A. Isolate and purify the resultant products in the manner described to obtain, respectively, the 21-carbomethoxylate, 21-carbopropoxylate, 21-carbobutoxylate, 21-carbo-octoxylate and 21-carbodecoxylate, respectively of 9α - chloro-11β-tosyloxy-16α-methyl-1,4-pregnadiene-17α,21-diol-3,20-dione.

B. Treat each of the 9α-chloro-11β-tosyloxy-pregnadiene-21-carboalkoxylates prepared in the foregoing example with aqueous methanol at 60° C. in a manner similar to that described in Example 8B. Isolate and purify the resultant products in a manner similar to that described to obtain, respectively the 21-carbomethoxylate, 21-carbopropoxylate, 21-carbobutoxylate, 21-carbo-octoxylate and 21-carbodecoxylate, respectively of 9α - chloro-11β-hydroxy-16α-methyl-1,4-pregnadiene-17α,21-diol-3,20-dione.

We claim:

1. The process which comprises reacting a 9α-halogeno-11β-X-steroid selected from the group consisting of the androstane and preganane series and the 19-nor-analogs thereof, wherein X is a member selected from the group consisting of a halogeno, hydrocarbonsulfonyloxy having up to 20 carbon atoms, and substituted hydrocarbonsulfonyloxy having up to 20 carbon atoms, X being other than iodo- when said 9α-halogeno- is 9α-iodo-,
    with a reagent defined by the formula: YZ,
    wherein Y is an anion selected from the group consisting of hydroxyl, azide and halide;
    and Z is a cation selected from the group consisting of hydrogen, ammonium, alkali metal ions, and alkaline earth metal ions;
    whereby is effected replacement of said 11β-X group by said anion Y, and there is formed a 9α-halogeno-11β-Y-steroid selected from the group consisting of the androstane and preganane series and the 19-nor analogs thereof, Y being as hereinabove defined.

2. The process according to claim 1 when carried out in a hydroxylic solvent, said process comprising reacting a 9α-halogeno-11β-X-steroid selected from the group consisting of the androstane and pregnane series and the 19-nor-analogs thereof, wherein X is a member selected from the group consisting of halogeno, hydrocarbonsulfonyloxy having up to 20 carbon atoms, and substituted hydrocarbonsulfonyloxy having up to 20 carbon atoms, X being other than iodo when said 9α-halogeno- is 9α-iodo-;
    in a hydroxylic solvent with a reagent defined by the formula, YZ:
    wherein Y is an anion selected from the group consisting of hydroxyl, azide and halide;
    and Z is a cation selected from the group consisting of hydrogen, ammonium, alkali metal ions, and alkaline earth metal ions;
    whereby is effected replacement of said 11β-X-group by said anion Y, and there is formed a 9α-halogeno-11β-Y-steroid, Y being as hereinabove defined.

3. The process of claim 1 when carried out in the presence of water.

4. The process of claim 2 when carried out in the presence of water.

5. The process of claim 2 wherein said hydroxylic solvent is aqueous methanol.

6. The process of claim 2 wherein said 9α-halogeno-11-β-X-steroid is a 9α-halogeno-11-β-X-pregnane substituted at C–21 by a member selected from the group consisting of hydroxy, alkanoyloxy having up to 10 carbon atoms, alkoxycarbonyloxy having up to 10 carbon atoms, and phosphate alkali metal salt;
    whereby is formed a 9α-halogeno-11β-Y-pregnane substituted at C–21 by a member selected from the group consisting of hydroxy, alkanoyloxy having up to 10 carbon atoms, alkoxycarbonyloxy having up to 10 carbon atoms, and phosphate alkali metal salt, Y being as defined in claim 2.

7. The process according to claim 1 wherein said 9α-halogeno-11β-X-steroid is a 9α-halogeno-11β-chloro-4-pregnene-17a, 21-diol-3,20-dione 21-phosphate sodium salt; and said reagent, YZ, is water (Y being hydroxyl and Z being hydrogen);
    whereby is effected replacement of said 11β-chloro group by said hydroxyl and there is formed a 9α-halogeno - 11β-hydroxy-4-pregnene-17α,21-diol-3,20-dione 21-phosphate sodium salt.

8. A process according to claim 7 wherein said 9α-halogeno - 11β - chloro-4-pregnene-17α,21-diol-3,20-dione 21-phosphate sodium salt is 9α-11β-dichloro-16α-methyl-1,4-pregnadiene-17α,21-diol-3,20-dione 21-disodium phosphate;
    said process comprising reacting 9α,11β-dichloro-16α-methyl - 1,4-pregnadiene-17α,21-diol-3,20-dione 21-disodium phosphate with water;
    whereby is formed 9α-chloro-11β-hydroxy-16α-methyl-1,4 - pregnadiene-17α,21-diol-3,20-dione 21-sodium phosphate.

9. A process according to claim 7 wherein said 9α-halogeno - 11β-chloro-4-pregnene-17α,21-diol-3,20-dione 21-phosphate sodium salt is 9α,11β-dichloro-16β-methyl-1,4-pregnadiene-17α,21-diol-3,20-dione 21disodium phosphate;
    said process comprising reacting 9α,11β-dichloro-16β-methyl-1,4-pregnadiene-17α,21-diol-3,20-dione 21-disodium phosphate with water;
    whereby is formed 9α-chloro-11β-hydroxy-16β-methyl-1,4 - pregnadiene-17α,21-diol-3,20-dione 20-sodium phosphate.

10. A process according to claim 7 wherein said 9α-halogeno - 11β - chloro-4-pregnene-17α,21-diol-3,20-dione 21-phosphate sodium salt is 9α-bromo-11β-chloro-16α-methyl - 1,4-pregnadiene-17α,21-diol-3,20-dione 21-disodium phosphate;
    said process comprising reacting said 9α-bromo-11β-chloro - 16α - methyl-1,4-pregnadiene-17α,21-diol-3, 20-dione 21-disodium phosphate with water;
    whereby is formed 9α-bromo-11β-hydroxy-16α-methyl-1,4 - pregnadiene-17α,21-diol-3,20-dione 21-sodium phosphate.

11. A process according to claim 1 wherein said 9α-halogeno-11β-X-steroid is a member selected from the group consisting of a 9α-chloro-11β-tosyloxy-4-pregnene-17α,21-diol-3,20-dione and the 21-lower alkanoates and 21-alkoxycarboxylates thereof having up to 10 carbon atoms,
    and wherein YZ is water (Y being hydroxyl and Z being hydrogen);
    whereby is formed a 9α-halogeno-11β-hydroxy-steroid selected from the group consisting of a 9α-chloro-11β-hydroxy-4-pregnene-17α,21-diol-3,20-dione and the 21-lower alkanoate and the 21-alkoxycarboxylate thereof.

12. A process according to claim 2 wherein said 9α-halogeno-11β-X-steroid is a member selected from the group consisting of a 9α-chloro-11β-tosyloxy-4-pregnene-17α,21-diol-3,20-dione 21-lower alkanoate and a 9α- chloro-11β-tosyloxy-4-pregnene-17α-21-diol-3,20-dione 21-alkoxycarboxylate, and wherein said hydroxylic solvent is aqueous methanol;

whereby is effected replacement of said 11β-tosyloxy group by said anion Y (Y being as defined in claim 2), and there is formed a member selected from the group consisting of a 9α-chloro-11β-Y-4-pregnene-17α,21-diol-3,20-dione 21-lower alkanoate and a 9α - chloro-11β-Y-4-pregnene-17α,21-diol-3,20-dione 21-alkoxycarboxylate.

13. A process according to claim 2 wherein said reagent, YZ, is water (Y being hydroxyl and Z being hydrogen), said hydroxylic solvent is methanol, and said 9α-halogeno-11β-X-steroid is a member selected from the group consisting of 9α-chloro-11β-tosyloxy-16α-methyl-1,4-pregnadiene-17α,21-diol-3,20-dione 21-cathylate and 9α - chloro-11β-tosyloxy-16α-methyl-1,4-pregnadiene-17α,21-diol-3,20-dione 21-acetate;

said process comprising reacting a member selected from the group consisting of 9α-chloro-11β-tosyloxy-16α - methyl-1,4-pregnadiene-17α,21-diol-3,20-dione 21-cathylate and 9α-chloro-11β-tosyloxy-16α-methyl-1,4 - pregnadiene-17α,21-diol-3,20-dione 21-acetate with water in methanol;

whereby is effected replacement of said 11β-tosyloxy group by said hydroxyl, and there is formed a member selected from the group consisting of 9α-chloro-11β - hydroxy - 16α-methyl-1,4-pregnadiene-17α,21-diol-3,20-dione 21-cathylate and 9α-chloro-11β-hydroxy - 16α-methyl-1,4-pregnadiene-17α,21-diol-3,20-dione 21-acetate.

14. A process according to claim 12 wherein said 9α-halogeno-11β-X-steroid is a member selected from the group consisting of 9α-chloro-11β-tosyloxy-16α-methyl-17α,21-diol-3,20-dione 21-acetate and 9α-chloro-11β-tosyloxy - 16α - methyl-1,4-pregnadiene-17α,21-diol-3,20-dione 21-cathylate, and said reagent, YZ, is sodium azide (Y being azido, Z being sodium ion);

said process comprising reacting a member selected from the group consisting of 9α-chloro-11β-tosyloxy-16α - methyl-1,4-pregnadiene-17α,21-diol-3,20-dione 21-acetate and 9α-chloro - 11β-tosyloxy-16α,methyl-1,4-pregnadiene-17α,21-diol-3,20-dione 21-cathylate with sodium azide in aqueous methanol;

whereby is formed a member selected from the group consisting of 9α - chloro-11β-azido-16α-methyl-1,4-pregnadiene-17α,21-diol-3,20-dione 21-acetate and 9α - chloro - 11β-azido-16α-methyl-1,4-pregnadiene-17α,21-diol-3,20-dione 21-cathylate.

15. A process according to claim 12 wherein said reagent, YZ, is sodium chloride (Y being chloride and Z being sodium ion), and said 9α-halogeno-11β-X-steroid is 9α-chloro-11β-tosyloxy - 16α - methyl-1,4-pregnadiene-17α,21-diol-3,20-dione 21-cathylate which comprises reacting 9α-chloro - 11β - tosyloxy-16α-methyl-1,4-pregnadiene-17α,21-diol-3,20-dione 21-cathylate with sodium chloride in aqueous methanol;

whereby is formed 9α,11β-dichloro-16α-methyl-1,4-pregnadiene-17α,21-diol-3,20-dione 21-cathylate.

References Cited

UNITED STATES PATENTS

| | | | |
|---|---|---|---|
| 2,894,963 | 7/1959 | Gould et al. | 260—397.45 |
| 3,049,554 | 8/1962 | Gould et al. | 260—397.45 |

LEWIS GOTTS, Primary Examiner

E. G. LOVE, Assistant Examiner

U.S. Cl. X.R.

260—397.3, 397.45, 999

UNITED STATES PATENT OFFICE
CERTIFICATE OF CORRECTION

Patent No. 3,463,793                                    August 26, 196

Hershel L. Herzog et al.

It is certified that error appears in the above identified patent and that said Letters Patent are hereby corrected as shown below:

Column 1, lines 18 and 19, cancel "(preferably anion". Column 2, line 31, "Orangic" should read -- Organic --. Column 3, line 65, "set set forth" should read -- set forth --. Column 4, line 13, "thta" should read -- that --; line 22, after "sodium phosphate" insert -- and 9$\alpha$-fluoro-11$\beta$-hydroxy-1,4-pregnadiene-17$\alpha$,21-diol-3,20-dione 21-sodium phosphate --. Column 5, line 10, "9$\alpha$-cholor-" should read -- 9$\alpha$-chloro- --. Column 6, line 5, "well be" should read -- will be --. Column 7, line 65, "homoloks" should read -- homologs --. Column 8, lines 46 and 47, "24.40 ml." should read -- 24.05 ml. --. Column 9, line 11, "(9$\alpha$-cholo-16$\alpha$-methylprednisolene)" should read -- (9$\alpha$-chloro-16$\alpha$-methylprednisolone) --; line 27, "to the" should read -- to that --; line 29, "-3,30-dione" should read -- -3,20-dione --. Column 10, line 7, "to the" should read -- to that --; lines 48 and 49 should read -- 21-phosphate from 9$\alpha$,11$\beta$-dichloro-16$\alpha$-methyl-1,4-pregnadiene-17$\alpha$,21-diol-3,20-dione 21-di- --; line 75, "titrate" should read -- titrated --. Column 11, line 34, "602" should read -- 6.02 --; line 37, "11$\beta$-chloro-" should read -- 11$\beta$-hydroxy- --; line 42, "3,21-dione" should read -- 3,20-dione --; line 46, "water.--dissolved" should read -- water.—Dissolve --. Column 11, line 63, "titrate" should read -- titrated --; line 64, "macterial" should read -- bacterial --. Column 15, line 51, "4-androstne-" should read -- 4-androstene- --. Column 17, line 15, "21-carbodecoxalate" should read -- 21-carbodecoxylate --. Column 18, line 46, "3,20-dione 20-sodium" should read -- 3,20-dione 21-sodium --.

Signed and sealed this 5th day of May 1970.

(SEAL)
Attest:

EDWARD M. FLETCHER, JR.
Attesting Officer

WILLIAM E. SCHUYLER, JR
Commissioner of Patents